(12) United States Patent
Duncan

(10) Patent No.: US 7,110,777 B2
(45) Date of Patent: Sep. 19, 2006

(54) APPARATUS AND METHOD FOR TRACKING THE LOCATION AND POSITION OF AN INDIVIDUAL USING AN ACCELEROMETER

(76) Inventor: Charles Duncan, 174 Littleton Rd., #3-341, Westford, MA (US) 01886

( * ) Notice: Subject to any disclaimer, the term of this patent is extended or adjusted under 35 U.S.C. 154(b) by 306 days.

(21) Appl. No.: 10/626,460

(22) Filed: Jul. 24, 2003

(65) Prior Publication Data

US 2004/0132461 A1    Jul. 8, 2004

Related U.S. Application Data

(63) Continuation-in-part of application No. 10/289,516, filed on Nov. 6, 2002, now abandoned.

(51) Int. Cl.
*H04Q 7/20* (2006.01)

(52) U.S. Cl. .................................. 455/456.1

(58) Field of Classification Search ............ 455/456.1, 455/404.2, 456.2, 456.6, 9
See application file for complete search history.

(56) References Cited

U.S. PATENT DOCUMENTS

| | | | |
|---|---|---|---|
| 5,119,072 A | 6/1992 | Hemingway | 340/573 |
| 5,515,419 A | 5/1996 | Sheffer | 455/456.5 |
| 5,546,072 A | 8/1996 | Creuseremee et al. | 340/574 |
| 5,714,932 A | 2/1998 | Castellon et al. | 340/539 |
| 5,812,056 A | 9/1998 | Law | 340/539.15 |
| 5,892,454 A | 4/1999 | Schipper et al. | 340/825.37 |
| 5,905,450 A | 5/1999 | Kim et al. | 340/967 |
| 5,982,281 A | 11/1999 | Layson, Jr. | 340/539 |
| 6,028,519 A | 2/2000 | Dessureau et al. | 340/573.1 |
| 6,031,460 A | 2/2000 | Banks | 340/573 |
| 6,091,956 A | 7/2000 | Hollenberg | 455/456 |
| 6,140,957 A | 10/2000 | Wilson et al. | 342/357.08 |
| 6,199,550 B1 | 3/2001 | Wiesmann et al. | 128/204.23 |
| 6,236,365 B1 | 5/2001 | LeBlanc et al. | 342/457 |
| 6,300,903 B1 | 10/2001 | Richards et al. | 342/450 |
| 6,369,694 B1 | 4/2002 | Mejia | 340/10.1 |
| 6,414,629 B1 | 7/2002 | Curcio | 342/357.08 |
| 6,531,985 B1 | 3/2003 | Jones et al. | 455/347 |
| 6,563,427 B1 | 5/2003 | Bero et al. | 340/573.1 |
| 6,581,000 B1 | 6/2003 | Hills et al. | 340/988 |
| 2002/0024443 A1 | 2/2002 | Hawkins et al. | 340/573.1 |
| 2002/0135336 A1 | 9/2002 | Zhou et al. | 320/101 |
| 2002/0140559 A1 | 10/2002 | Zhou et al. | 340/573.1 |

FOREIGN PATENT DOCUMENTS

| | | |
|---|---|---|
| WO | WO 99/049331 | 9/1999 |
| WO | WO 02/003344 | 1/2002 |
| WO | WO 02/003347 | 1/2002 |
| WO | WO 02/056274 | 7/2002 |

*Primary Examiner*—William D. Cumming
(74) *Attorney, Agent, or Firm*—Edwards Angell Palmer and Dodge LLP; Ralph A. Loren

(57) ABSTRACT

The present invention generally relates to electronic position and location tracking of various items. More particularly, the present invention is useful for tracking of an individual's position and location. Data is received from both an external position locating apparatus and an accelerometer and is converted into both position and direction of travel information.

17 Claims, 4 Drawing Sheets

APPARATUS AND METHOD FOR TRACKING THE LOCATION AND POSITION OF AN INDIVIDUAL USING AN ACCELEROMETER

REFERENCE TO RELATED APPLICATIONS

This application is a continuation-in-part of U.S. patent application Ser. No. 10/289,516, entitled "APPARATUS AND METHOD FOR TRACKING THE LOCATION AND POSITION OF AN INDIVIDUAL," filed Nov. 6, 2002 now abandoned, the disclosure of which is incorporated herein by reference.

BACKGROUND OF THE INVENTION

Locating the position and direction of a target item regardless of the surroundings has long held promise as particularly desirable. Thwarting child abductions, for example, is greatly simplified if the location and direction of travel of a child is available at all times to a parent. Additionally, monitoring the direction and location of an expensive asset, such as a laptop computer, allows misplaced items to be quickly found while simultaneously preventing theft. Knowing the last location and direction of travel of an item assists searchers, as their initial search may be directed along probable pathways as opposed to searches that start in a large geographic area without any preliminary guidance. Since the probability of locating an item diminishes greatly with the passing of time between the actual abduction or theft and the realization that the tracked item is missing, limiting the search area assists in rapid recovery.

While this position and direction information is desirable, its implementation into a suitable product has proved difficult. Traditionally, there have been two classes of tracking apparatus; those that rely on direct radio communication and those that use a satellite system such as a GPS. The radio communication systems are typically burdened by size restrictions and are limited to ranges which support direct radio frequency communication. In the event a monitor or target strays into an area where RF communication between the monitor and target cannot be maintained, tracking is interrupted and the target is lost. For example, if a child in a large indoor mall strays beyond the range of a parent monitor, this results in the loss of all tracking information. This child may now continue to stray further from a parent, in any direction, without the parent receiving updated position and direction information. As the distance increases, and the child's haphazard directions continue to change, locating this child becomes substantially more difficult.

The satellite tracking systems are also limited by their ability to receive external position signals. Some modern tracking systems use global positioning data (GPS) to pinpoint the location of an item. For example, a vehicle may have an on-board GPS receiver coupled to a RF transceiver for broadcasting the location of the vehicle following the report by the owner that the vehicle has been stolen. A thief may have stolen the vehicle several hours before the tracking report was initiated, and driven the vehicle a long distance from the scene of the crime. During this time, the position and location of the vehicle are unknown unless there was a constant monitoring system. This is inefficient in energy and not practical. If the vehicle is concealed in a setting that does not allow for the reception of a GPS signal, such as in a garage or under heavy tree cover, locating the vehicle using the on-board tracking system is no longer possible. Additionally, existing GPS based tracking systems are typically large in physical size, and have substantial power demands. While such physical size and power requirements are normally not of concern when the tracking device is located within the confines of a motor vehicle, it may be for other uses.

Many existing tracking only address position tracking in a two dimensional environment (i.e., along the X and Y axes). In the aforementioned shopping mall environment, a child may moved between floors (i.e., in the Z axis direction) while still remaining within RF communication with a mobile parent monitor. In such a scenario, the child appears in close physical proximity on a parent monitor display, but is in actually well beyond the "safe zone" of the parent. If the parent monitor indicated the child has strayed beyond the predefined safe zone, a parent attempting to locate this child is faced with the dilemma of locating a child that may be several floors above or below his current position. In such a setting, a child abductor can cover a great distance before the last know position of the child is determined.

SUMMARY OF THE INVENTION

The present invention addresses the above-described limitations associated with location and directional tracking of a target item.

The present invention features several ways to determine position of the target item. A communication link between a mobile monitor and a mobile target device is provided. This communication may occur directly between the transceivers of the mobile monitor and mobile target, or may be occur via an intermediary element serving as a RF relay. This RF relay may be the existing cellular phone network, such as the AMPS cellular network, or may be a two-way radio link. Communication forwarding utilizing an existing RF relay infrastructure allows for the communication between monitor and target over a great distance and vast geographic area as compared to that that allowed by direct communication between mobile target and mobile monitor. Position locating between the mobile monitor and mobile target requires a strong signal. The mobile target continuously maintains accelerometer data along a plurality of axes between the intervals that mobile monitor transmissions occur. Thus the accelerometer data provides movement data from each mobile monitor positioning transmission to the next.

If a signal is not sufficiently strong for position location, data transfer between the mobile monitor and the mobile target is attempted. The mobile target then returns the compilation of acceleration movements along the plurality of axes since the last mobile monitor positioning transmission that was successful. This acceleration data, in combination with previously recorded external position data, is processed by the mobile monitor to compute the mobile target's current position.

The mobile monitor incorporates a multi-axis accelerometer of its own. If the mobile monitor is not able to receive a data transmission from the mobile target, then the mobile monitor uses data from its own accelerometer to guide the user of the mobile monitor to the last known location of the mobile target.

Data received by the mobile monitor may be subsequently displayed to an operator. This display can take the form of a visual display, for example, or may be a voice prompt. Additionally, information such as latitude and longitude of the present position of the mobile target may be displayed by the mobile monitor.

This ability to communicate over larger distances than existing tracking devices, as well as the ability to continue tracking a target without the need of an external position locating signal, addresses the inherent flaws in existing tracking technology. Additionally, as the mobile target may take the form of a small wristwatch sized element, the opportunity to unobtrusively track a variety of items which have not been traditionally monitored due to size constraints now exists.

BRIEF DESCRIPTION OF THE DRAWING

FIG. 3 illustrates a schematic representation of the mobile monitor device; and.

DETAILED DESCRIPTION

Figure 1:
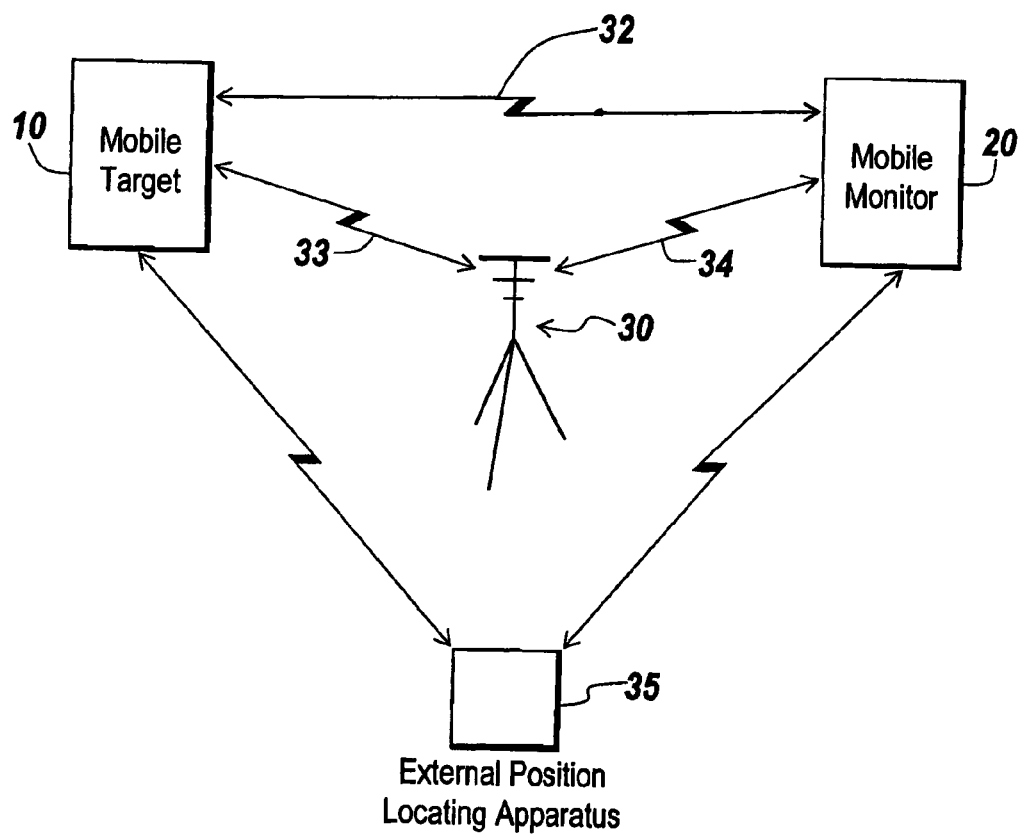
FIG. 1 illustrates a schematic diagram of the position and location indicating apparatus.

The direction and locating indicating apparatus for tracking a target object described herein can be employed in numerous locales. For example, this apparatus may be used by a parent to monitor a child in an indoor shopping mall where there are numerous places where GPS position data cannot be received. The apparatus provides continuous distance and location information to an operator based upon a radio frequency communication between the target and monitor. This information may be displayed graphically on a video display, or it may be presented audibly to an operator.

A parent/guardian can also define a fixed "safe zone" for the target. The safe zone is an attribute of the mobile monitor. A mobile target is first introduced to the mobile monitor by entering the mobile target's identification number into the mobile monitor and a preliminary "safe zone" may be defined. This data entry can be accomplished utilizing a stylus and touch screen or a remote link to the mobile monitor, such as an infrared (IR) signal, may be used. For example, a parent may select a 30 foot "safe zone" for their child. Should the child venture outside this 30 foot safe zone, the mobile monitor user will be alerted. This alert can take the form of an audible warning, vibration or a visual alert. In addition to the "safe zone" information, a parent may add additional identifying information, such as a child's name. Identifying information and safe zone setting may be updated or changed at will by a mobile monitor operator.

Additionally, multiple mobile monitors may track multiple mobile targets. In a situation such as this, targets may be "handed-off" among multiple authorized mobile monitors. The automatic hand-off occurs when a mobile target is within an area that is being monitored by multiple mobile monitor devices. As the mobile target strays beyond the "safe zone" of one mobile monitor, this monitor sends a query to all other monitors who are authorized to track the mobile target. This query is used to determine if the mobile target remains within the safe zone of any remaining authorized mobile monitor. If the mobile target remains within the safe zone of a second authorized mobile monitor, monitoring of the target may be passed from a first monitor to a second monitor. The initial mobile monitor is now no longer responsible for the monitoring of the mobile target. Following the hand-off, all mobile monitors are alerted as to which remaining mobile monitors are responsible for tracking the mobile target. All of the mobile monitors may communicate the position of all targets, but the target is only "polled" by the responsible mobile monitor. All mobile monitors will be informed of the new owner of the target. The new owning mobile monitor is the only monitor to directly communicate with the mobile target for positioning information.

In practice, a hand-off procedure such as this allows teachers to monitor the whereabouts of an entire class on a field trip. Should an individual student stray beyond the safe zone defined by his teacher, this student may be automatically "handed-off" to an authorized chaperone so long as the student is within the safe zone defined by the chaperone. The teacher will be informed as to which chaperone is now responsible for this student and will continue to receive "safe zone" alerts regarding this handed-off student from the new owning monitor.

All mobile monitors track one another using the same positioning signals and computations as described for mobile target devices. Non-owner monitors receive positioning information for mobile targets by exchanging data with the single owning mobile monitor. Each monitor can then display the position of mobile targets for which they are not the owner of by adding the multiple axes for the mobile target as seen by the owning monitor to the axes of the owning monitor as seen by the non-owning mobile monitor.

When a mobile target exceeds the safe distance from their current owning mobile monitor, all authorized mobile monitors will receive the "out-of-range" alert as well as the position of the child.

All mobile monitors can act as "relays" to the others, transmitting information on mobile targeting even if the mobile target is out of range.

The mobile monitor also allows the "release" of a mobile target. A release is a manual procedure by which an operator selects an individual mobile target device from a list of watched items and marks it as "released" which prevents the initiation of an alert condition should the selected released mobile target stray beyond its respective safe zone. However, switching to a release mode does not prevent the continual tracking of a mobile target. The release can be for a fixed period of time, such as 30 seconds or 1 minute, or it can be permanent. The release can also be automatically removed upon the return of a mobile target within the confines of the predetermined safe zone.

A manual release proves useful in setting such as an amusement park setting. A father, for example, may elect to temporarily release his daughter after placing her on a roller coaster. Absent a release function, when riding this roller coaster, the daughter may initiate numerous alert conditions for straying beyond the safe zone set by her father. While the roller coaster is in motion, however, there is little potential for an abduction to occur. Using a manual release, this father may temporarily halt alerts while his daughter continues to enjoy the ride. After the ride is complete and the child is back within a safe zone of the mobile monitor, the release condition may be manually or automatically removed. Monitoring then resumes in a pre-released fashion.

Referring now in detail to the drawing wherein like parts are designated by like reference numerals throughout, FIGS. 1–4 illustrate examples of a position and direction indicating apparatus for locating an item to be tracked. Although the present invention will be described with reference to the embodiments illustrated in the Figures, it should be understood that the present invention may be embodied in many alternative forms. In addition, any suitable size, shape, or type of elements or materials could be utilized.

FIG. 1 illustrates one example of a position and direction indicating apparatus for locating an individual. This position and direction indicating apparatus includes a mobile target 10 sized and constructed for attachment to an individual to be tracked. Mobile target 10 is designed to be resistant to shock and the elements so it can be used outdoors. Mobile target 10 can take the form of a wristwatch and secure band arrangement, such that a small child may unobtrusively wear the device. In addition, the device may be simply attached to a target to be tracked using an adhesive or a clamping arrangement. Mobile monitor 20 and mobile target 10 communicate utilizing a radio frequency (RF) link. In the event mobile target 10 and mobile monitor 20 are in close proximity to each other, this RF link may be direct in nature or may utilize a RF relay element 30. Relay element 30 is capable of rebroadcasting a signal from mobile target 10 to mobile monitor 20 in the event that mobile target 10 and mobile monitor 20 are separated by a distance too great for direct RF communication to occur. Utilizing the RF relay element 30, RF communication is initially established between mobile target 10 and relay element 30. Relay element 30 then broadcasts information from relay element 30 to mobile monitor 20. Relay element 30 may be, for example, an existing AMPS cellular tower. This allows the use of a well established infrastructure allows signal transmission from mobile target 10 to mobile monitor 20 over great distances. It should also be noted that while FIG. 1 depicts a single RF relay element 30, a plurality of relay elements may be used to transmit a signal from mobile target to mobile monitor across a large geographic area. Mobile target 10 and mobile monitor 20 can also receive and transmit information with an external position locating apparatus 35.

Figure 2:
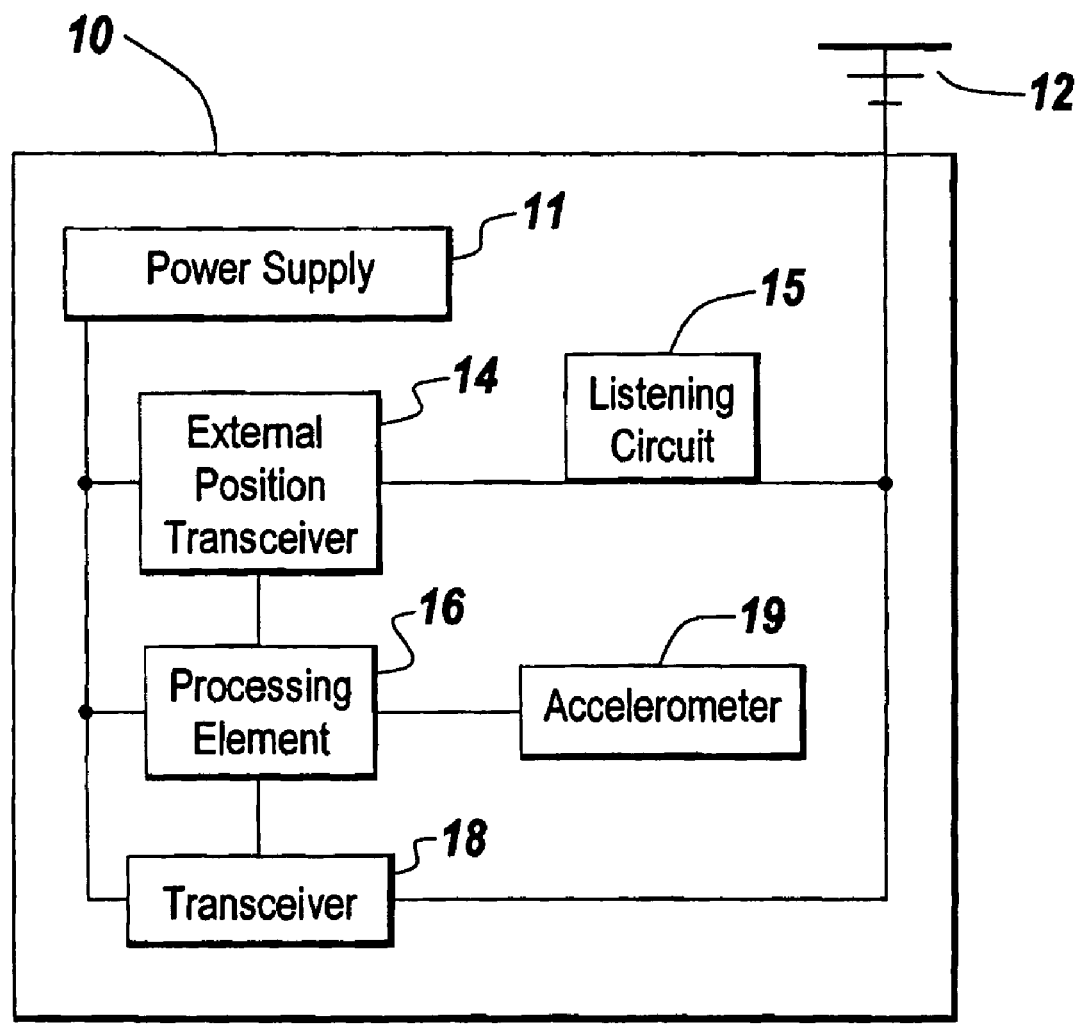
FIG. 2 illustrates a schematic representation of the mobile target device.

FIG. 2 schematically represents mobile target 10. Mobile target 10 is capable of transmitting and receiving a plurality of radio frequency signals. Power for the transmission of this signal may be provided by an on-board power supply 11. Most often, this power supply will be an internal rechargeable battery, for example, a battery that may be recharged using a direct connection or inductive coupling.

Antenna 12 allows for the reception of numerous RF signals. For example, antenna 12 may receive a signal from external position locating apparatus 35, such as a GPS satellite transmitter. Additionally, antenna 12 allows for the reception and transmission of RF signals between mobile monitor 20 and mobile target device 10. Antenna 12 may take the form of a single antenna capable of transmitting and receiving a signal simultaneously, or may be multiple antennas in an array. Antenna 12 should be an omnidirectional antenna or near-omnidirectional antenna. Preferred antennas are the Centurion Micro-Internal P/N CAF94251 and the GigaArt Flavos 2.4 Ghz P/N 9090B5660-01. Mobile target 10 may also include an external position locating transceiver 14 with an extended Bluetooth protocol which is in communication with an external position locating apparatus 35. External position locating transceiver 14 may also be in electrical communication with processing element 16, such an on-board computer chip, within mobile target 10. Additionally, mobile target transceiver 18, an RF transceiver such as a 2.4 Ghz spread spectrum receiver is in communication with the antenna array 12. Mobile target transceiver 18 is capable of providing communication between mobile target 10 and mobile monitor 20. Communication between mobile target transceiver 18 and mobile monitor 20 may occur directly with mobile monitor 20 or may be processed through and intermediary RF relay element 30. Furthermore, mobile target transceiver 18 is in electrical communication with processing element 16 on mobile target 10. Processing element 16 is capable of receiving an external position data signal from external position locating transceiver 14, comprising current position as well as velocity information. Additionally, processing element 16 may receive data from an integral accelerometer 19. This accelerometer 19 is normally a multi-axial accelerometer, capable of providing two, or preferably three, dimensional acceleration data to processing element 16. Multiple temperature compensated, gas-thermal accelerometers such as those available from Memsic, Inc. (Andover, Mass.) are useful in the invention. Upon reception of this acceleration data from accelerometer 19, processing element 16 calculates velocity and distance traveled along each sampled axis. External position locating transceiver 14 may include a dedicated listening circuit 15 that searches for the presence of external positioning data received from antenna array 12. If a GPS signal is found, the GPS receiver will take a fix and that data is transferred to processing element 16. Processing element 16 is capable of utilizing known position data received from external position locating source 35, as well as derived distance and velocity information from accelerometer 19, to calculate the current position and velocity of mobile target device 10. Accelerometer data is continuously recorded from the last time an external reading was taken from any source including GPS. This current position and velocity is then transmitted by the RF transceiver 18 of the mobile target device to mobile monitor device 20. As noted previously, this transmission may occur directly between mobile monitor 20 and mobile target 10, or may pass through relay element 30.

Figure 3:
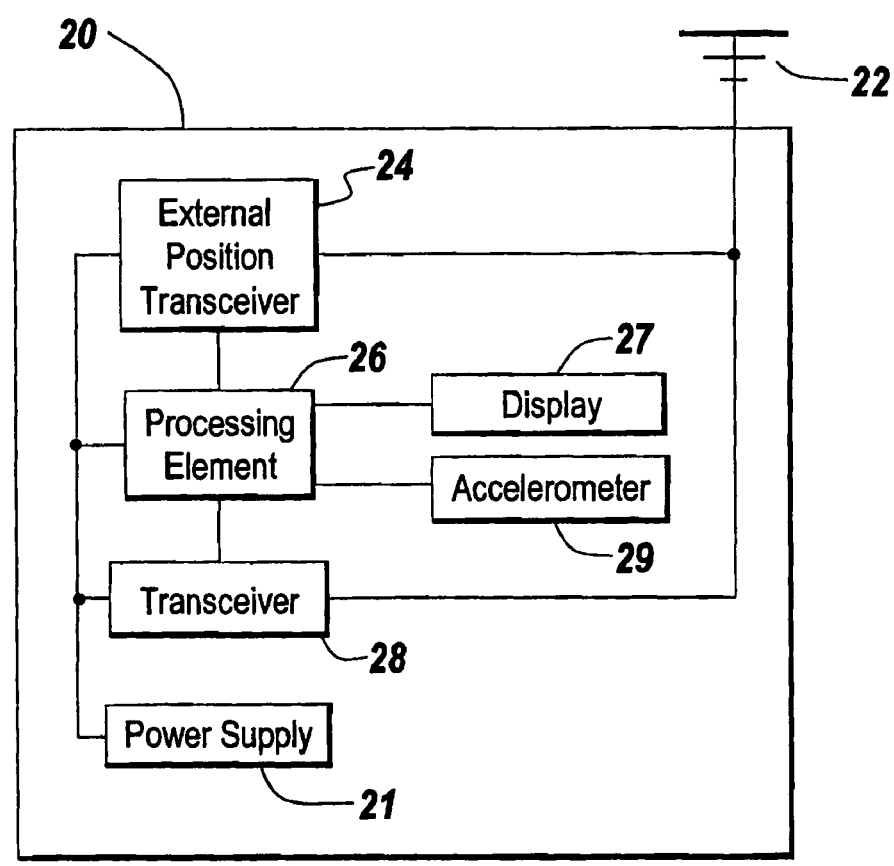

FIG. 3 discloses a schematic illustration of a mobile monitor 20 for use with the mobile target 10 described above. Mobile monitor 20 contains a second omnidirectional antenna 22 capable of receiving a plurality of RF signals. Second antenna 22 may be a single antenna element capable of receiving and transmitting a plurality of signals simultaneously, or may comprise multiple antenna elements. Second antenna 22 is in communication with a second external positioning transceiver 24 and a second RF transceiver 28. Second external positioning transceiver 24 is capable of receiving positioning data from external position source 35, for example, a GPS satellite.

Figure 4:
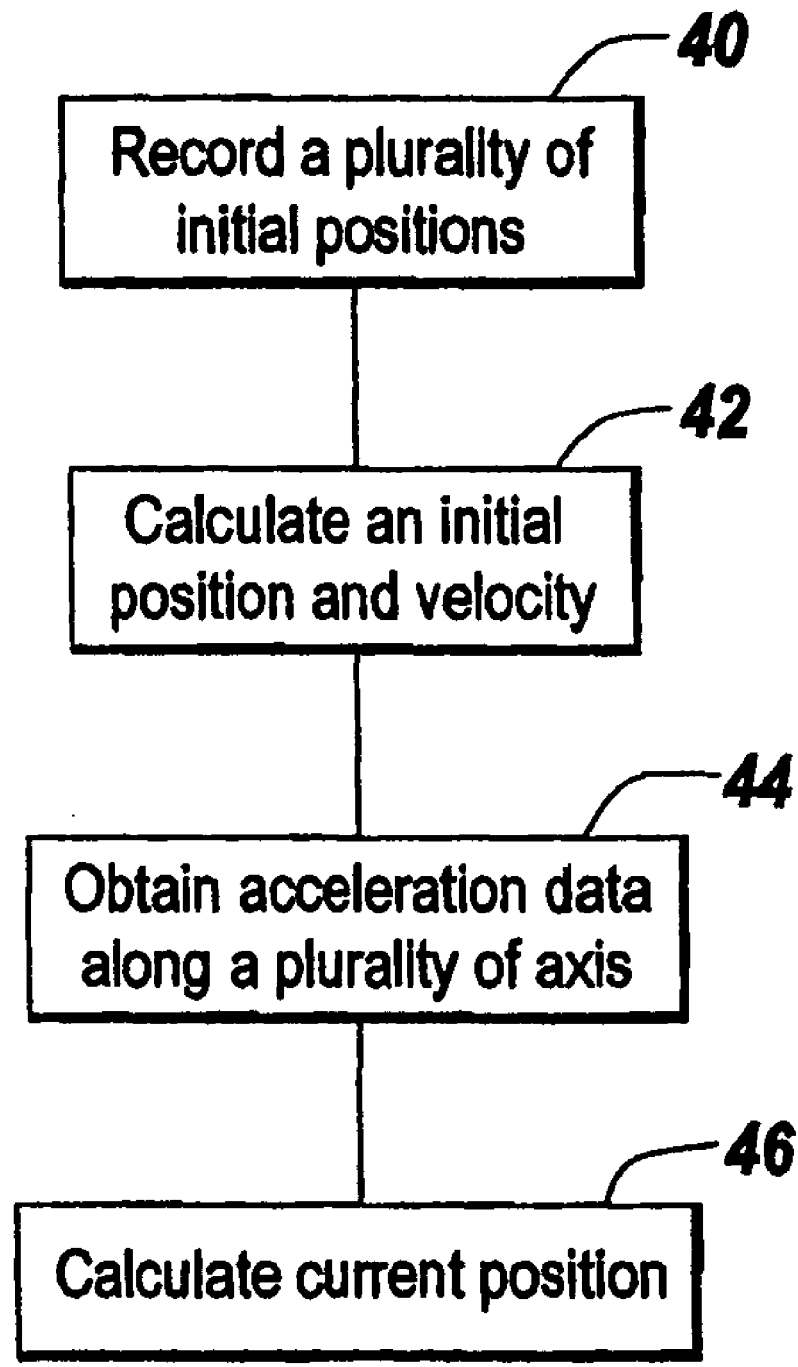
FIG. 4 is a flow diagram which illustrates a method for tracking the location of an individual in accordance with the present invention.

Second RF transceiver 28 of mobile monitor 20 provides a data channel and is capable of communication with one or more mobile targets 10 utilizing a direct communication link or using a RF relay element 30. Data received by second external position transceiver 24 within mobile monitor 20 may come from multiple mobile targets 10 and is delivered to a second processing element 26 such as an on-board computer chip carried on mobile monitor 20. Additionally, data received by second RF transceiver 28 from a mobile target 10, including position and direction of mobile target 10, is delivered to processing element 26 via an electrical pathway. Second processing element 26 then processes this data to calculate the position of mobile target 10 relative to mobile monitor 20. This relative position may then be displayed visually, by vibration or audibly to a user of mobile monitor 20 via display element 27. Furthermore, mobile monitor 20 may include a second accelerometer 29 in communication with processing element 26. Second accelerometer 29 is similar to accelerometer 19 used in mobile target 10. Should external position data retrieval by mobile monitor 20 be interrupted, second accelerometer 29 may be used to provide supplemental position and direction data on the location and velocity of mobile monitor 20. Supplemental acceleration data is received by second processing element 26, and in combination with originally received external position indicating information, a current position and velocity of mobile monitor 20 may be calculated. This calculated position may then be compared to position and direction data from mobile target 20 received by second RF transceiver 28, so the relative position of mobile target 10 to mobile monitor 20 may be computed and displayed to a mobile monitor operator. Electrical power for mobile monitor functions is provided by an integral power source 21 on mobile monitor 20. This power supply may take the form of a rechargeable or replaceable battery array, which thereby allows mobile monitor 20 to be operated at any location. Additionally, mobile monitor 20 may contain provisions for connection of an external power supply element, thereby allowing the unit to operate without reliance on the internal batteries, and simultaneously allowing the recharging of the on board battery FIG. 4 is a flow diagram for practicing one aspect of the pending invention. Initial readings are taken of position of the mobile target and the mobile monitor, e.g., using a GPS system (Step 40). From the series of initial position readings taken at known times, position and velocity can be determined (Step 42). In addition, the relative position of the mobile target based on the position of the mobile monitor can be determined and RF communication between the mobile target and the mobile monitor can be initiated. Communication from the mobile target to the mobile monitor can be by direct line of sight communication or through an external source or network.

The accelerometers provide data on acceleration along each of the axes (step 44). From the position and velocity data taken before the external signal is lost, and the data from the accelerometers, position and velocity information can be calculated (Step 46).

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A locating systems for tracking the movement of an item comprising:
    A mobile target sized for attachment to an item to be traced, said mobile target comprising a first accelerometer, a first external position locating transceiver, a first processing element and a first radio frequency (FR) transceiver and
    A mobile monitor, said mobile monitor including a second processing element and a second RF transceiver.

2. the locating system of claim 1, wherein said first accelerometer is capable of recording acceleration along a plurality of axes.

3. The locating system of claim 2, wherein and first accelerometer is a temperature compensated gas-thermal accelerometer.

4. The locating system of claim 1, wherein said mobile monitor contains a second accelerometer, said second accelerometer being a multi-axial accelerometer.

5. the locating system of claim 4, wherein the second accelerometer comprises a temperature compensated gas-thermal accelerometer.

6. The locating system of claim 1, wherein said first external position locating transceiver comprises a GPS receiver.

7. the locating system of claim 1, wherein said first external position locating transceiver comprises a device capable of bi-directional RF communication between said mobile target and said mobile monitor.

8. The locating system of claim 1, wherein said first processing element is capable of calculating an initial velocity of the item to be tracked using a plurality of external positioning signal data points received by said first external position locating transceiver.

9. The locating system of claim 1, wherein said first RF transceiver element is capable of commiunicating with the relay element using cellular network selected from the group consisting of AMPS, CDPD, GSM and CDMA network protocols.

10. The locating system of claim 1, wherein said first RF transceiver further comprising a first plurality of embedded antenna elements, said antenna elements being capable of communication with an RF relay element.

11. The locating system of claim 1, wherein said second RF transceiver further comprises a second plurality of embedded antenna elements, wherein said antenna elements are capable of communicating with an RF relay element.

12. The locating system of claim 1, wherein said first external position locating transceiver further comprises a listening circuit, said listening circuit being capable of determining if an external positioning signal is present.

13. The locating system of claim 12, wherein said listening circuit is capable of communicating the status of the external positioning circuit signal to said first processing element.

14. The locating system of claim 1, wherein said first processing element is capable of calculating a plurality of velocity vectors representing instantaneous velocity of an item to be tracked along multiple axes using accelerometer data recorded along said multiple axes.

15. The locating system of claim 14, wherein said first processing element is capable of calculating the position of a mobile m monitor device relative to an item to be tracked utilizing initial velocity data and velocity vector data from the first accelerometer.

16. The locating system of claim 1, further comprising one or more RF relay elements, said relay element capable of communicating with said first and second RF transceiver elements wherein the relative distance and direction of the mobile target device may be transmitted to the mobile monitor device.

17. A method for determining the position of a target item to be tracked, comprising the steps of:
    Recording a plurality of initial positions at selected times of the item to be tracked derived from a signal from an external position locating transceiver at selected times,
    Calculating an initial position and velocity from said plurality of positions and times,
    Obtaining accelerometer data along each axis from a multi-axis accelerometer, and
    Calculating the current position of the target item to be tracked from said initial position and velocity and said accelerometer data.

* * * * *